United States Patent
Hüttermann et al.

(10) Patent No.: US 7,071,326 B2
(45) Date of Patent: Jul. 4, 2006

(54) ANIONIC CELLULOSE NITRATE DERIVATIVES AND AQUEOUS DISPERSIONS THEREOF

(75) Inventors: Carsten Hüttermann, Braunschweig (DE); Thomas Wagner, Walsrode (DE); Klaus Nachtkamp, Walsrode (DE)

(73) Assignee: Wolff Cellulosics GmbH & Co. KG, Walsrode (DE)

( * ) Notice: Subject to any disclaimer, the term of this patent is extended or adjusted under 35 U.S.C. 154(b) by 0 days.

(21) Appl. No.: 11/290,193

(22) Filed: Nov. 30, 2005

(65) Prior Publication Data

US 2006/0117998 A1    Jun. 8, 2006

(30) Foreign Application Priority Data

Dec. 3, 2004  (DE)  .................. 10 2004 058 577

(51) Int. Cl.
  *C08B 7/00*    (2006.01)
  *C09D 101/20*  (2006.01)
(52) U.S. Cl. .............. 536/36; 106/169.01; 106/169.46; 106/169.56; 524/37
(58) Field of Classification Search ................. 536/36; 106/169.46, 169.56, 169.01; 524/37
  See application file for complete search history.

(56) References Cited

U.S. PATENT DOCUMENTS

| 2,093,464 | A | * | 9/1937 | Maim et al. ................. 536/63 |
| 2,358,387 | A | * | 9/1944 | Dreyfus et al. ............... 8/129 |
| 4,177,172 | A |   | 12/1979 | Traenckner et al. .......... 260/15 |
| 5,521,292 | A |   | 5/1996 | Ueda et al. .................... 536/2 |

FOREIGN PATENT DOCUMENTS

| DE | 30 07 936 A1 | 9/1981 |
| JP | 63-135401 | 6/1988 |
| RU | 2 170 235 C2 | 7/2001 |

\* cited by examiner

*Primary Examiner*—David M. Brunsman
(74) *Attorney, Agent, or Firm*—Joseph C. Gil

(57) ABSTRACT

An anionic cellulose nitrate derivative is described, which has: (i) a degree of acid group substitution (DS (acid)) in the range of 0.01 to 0.2; and (ii) a nitrogen content of 10.7 wt. % to 12.3 wt. %, based on the weight of cellulose nitrate derivative. The anionic cellulose nitrate derivative is prepared by a process which includes esterifying cellulose nitrate feed material with at least one dicarboxylic acid anhydride (e.g., maleic anhydride). Aqueous dispersions according to the present invention include: (a) at least on anionic cellulose nitrate derivative according to the present invention; and (b) at least one base.

10 Claims, No Drawings

ANIONIC CELLULOSE NITRATE DERIVATIVES AND AQUEOUS DISPERSIONS THEREOF

CROSS REFERENCE TO RELATED PATENT APPLICATION

The present patent application claims the right of priority under 35 U.S.C. §119 (a)–(d) of German Patent Application No. 102004058577, filed Dec. 3, 2004.

FIELD OF THE INVENTION

The present invention relates to novel anionic cellulose nitrate derivatives, their preparation, and to aqueous dispersions containing such anionic cellulose nitrate derivatives.

BACKGROUND OF THE INVENTION

Cellulose nitrates are often used e.g. as film-forming agents in wood varnishes, printing inks, nail varnishes and leather coatings. Because of their hydrophobic properties, they are predominantly employed in organic solutions, leading to considerable environmental pollution. Neutral cellulose nitrates according to the prior art are conventionally only introduced into aqueous systems together with volatile organic solvents with the input of energy by emulsifying, which leads to environmental pollution that is unacceptable today.

Systems are also known in which cellulose nitrates without any further chemical modification are used in aqueous systems. In DE 27 03 075, for example, an aqueous coating composition dispersion is described which contains cellulose nitrate, alkyd resin, plasticiser and a polymeric emulsifier. In DE 30 07 936, aqueous dispersions of polyacrylates, cellulose esters (preferably cellulose nitrate), plasticisers, emulsifiers and fatty acid-modified resins are described.

However, these always exhibit not inconsiderable proportions of emulsifiers and other additives, which stabilise the emulsions. These additives generally entail disadvantages. If the emulsifiers are polymeric compounds, the dispersions are often highly viscous, which causes substantial impairment of the application properties. If, on the other hand, low-molecular-weight emulsifiers are used, these can escape from the coating, which can lead to health problems and environmental pollution.

The dispersions according to DE 30 07 936, on the other hand, still contain considerable quantities of organic solvents (cf. Example 1 in DE 30 07 936).

A need still existed, therefore, for cellulose nitrate derivatives that form stable aqueous dispersions without the addition of emulsifiers and organic solvents.

Surprisingly, it has now been found that this object is achieved by cellulose nitrate derivatives that can be produced by esterification of cellulose nitrate with dicarboxylic anhydrides and have a degree of substitution of the acid group (DS(acid)) in the range of 0.01–0.2 and a nitrogen content of 10.0% to 12.3%.

The production of some cellulose nitrate derivatives with anionic side groups is already known.

In DE 42 3 8453, binder compositions are described which contain polysaccharide nitrates with hydrophilic functional groups. The polysaccharide nitrates are produced by nitration of anionic polysaccharides and contain 0.2 to 1.5 hydrophilic groups per anhydroglucose unit. The binder compositions described require the use of 1–45 wt. % organic solvents, however.

In RU 2170235, the production of cellulose nitrate phthalate by esterification of cellulose nitrate with phthalic anhydride is described. However, there is no mention of an improvement in dispersibility due to the esterification or of a use of the cellulose nitrate derivative in dispersions.

In JP 63-135401, cellulose nitrate derivatives are described which are produced by esterification of cellulose nitrate with maleic anhydride. The products can be used as binders for magnetic coatings.

SUMMARY OF THE INVENTION

In accordance with the present invention, there is provided an anionic cellulose nitrate derivative (or product) that is prepared by a process comprising esterifying cellulose nitrate (starting or feed material) with at least one dicarboxylic acid anhydride (also referred to herein as "acid anhydrides" or "dicarboxylic anhydrides"), wherein the anionic cellulose nitrate derivative has, (i) a degree of acid group substitution of (DS (acid)) in the range of 0.01 to 0.2 (also referred to herein as "degree of substitution of the acid group"), and (ii) a nitrogen content of 10.7 wt. % to 12.3 wt. %, based on the weight of cellulose nitrate derivative.

As used herein and in the claims, the "nitrogen content" of the cellulose nitrate starting (or feed) materials and the cellulose nitrate derivatives (or products) is determined in accordance with the Schlösing-Schulze-Tiemann method (as described in further detail in the examples herein).

As used herein and in the claims, the "degree of acid group substitution (DS (acid))" of the cellulose nitrate derivatives (or products) was determined by means of potentiometric titration (as described in further detail in the examples herein).

As used herein the term "permanently stable dispersion" with regard to the cellulose nitrate derivative dispersions of the present invention, means a dispersion of cellulose nitrate derivative that produces substantially no sedimentation after standing for 7 days at a temperature of 20° C.

Other than in the examples, or where otherwise indicated, all numbers or expressions, such a those expressing structural dimensions, etc, used in the specification and claims are to be understood as modified in all instances by the term "about."

DETAILED DESCRIPTION OF THE INVENTION

By esterification of free hydroxyl groups in cellulose nitrates with dicarboxylic anhydrides, acid groups are bonded covalently to the cellulose nitrates to render them more hydrophilic. The cellulose nitrate derivatives (CND) have a degree of substitution of acid groups (DS(acid)) in the range of 0.01 to 0.2 and a nitrogen content of 10.7 wt. % to 12.3 wt. %, based on the weight of CND. These are dissolved in an organic, highly volatile solvent and neutralised with a base. This solution with the anionic cellulose nitrates can be readily dispersed with water. Film-forming auxiliary substances or aqueous systems, such as acrylate or polyurethane dispersions, can be added to the dispersion. After removal of the organic solvent by distillation, a dispersion with permanent stability is present.

Cellulose nitrate derivatives are cellulose nitrates that contain other functional groups in addition to the nitrate groups. These groups can be covalently bonded to the cellulose nitrate by etherification, esterification or other grafting reactions. The cellulose nitrate derivatives used according to the invention can be produced by esterification of cellulose nitrate (starting or feed material) with dicarboxylic anhydrides. In this way, an acid group is bonded to the cellulose nitrate, resulting in a considerable increase in the hydrophilicity of the resulting cellulose nitrate derivative. The degree of substitution of the acid group (DS(acid)) is in the range of 0.01–0.20, preferably in the range of 0.01–0.15.

Cellulose nitrates containing free hydroxyl groups are typically suitable for the production of the cellulose nitrate derivatives according to the invention. Cellulose nitrates having a nitrogen content of 10.7%–12.3% are preferred.

Surprisingly, it has been found that those cellulose nitrates containing more than 12% nitrogen (in particular from 12.0 to 12.3 wt. %) may also be esterified.

Suitable acid anhydrides include those that contain at least one free acid group after esterification. Examples of dicarboxylic acid anhydrides that may be used in the present invention include, but are not limited to, succinic anhydride, maleic anhydride, phthalic anhydride, glutaric anhydride, itaconic anhydride and dodecenylsuccinic anhydride. The anhydrides of succinic acid and maleic acid and their derivatives are preferred.

The acid anhydrides are used in a quantity such that the cellulose nitrate derivative obtained has a degree of substitution in respect of the acid group (DS(acid)) in the range of 0.01–0.20, preferably in the range of 0.01–0.15.

The conversion to the cellulose nitrate derivatives can be performed homogeneously in solvents in which both the acid anhydride and the cellulose nitrate are soluble. Acetic acid, organic esters and ketones are particularly suitable. The conversion can also be performed heterogeneously in a slurry medium, in which the acid anhydride is dissolved in the liquid phase and the cellulose nitrate is present in suspension. The esterification is preferably performed at elevated temperature, preferably at temperatures of more than 80° C. (e.g., from 80° C. to 120° C.).

The use of catalysts, which are conventionally used for esterifications of alcohols with acid anhydrides, is possible but not necessary.

The purification of the cellulose nitrate derivatives and the separation of unreacted acid anhydrides may be performed by precipitation in a suitable precipitant. A particularly suitable precipitant is water. In the case of heterogeneous conversion, it is sufficient to wash the cellulose nitrate derivative with a solvent in which the acid anhydride and the slurry medium dissolve, but not the cellulose nitrate derivative.

Another process that may be employed in the present invention involves the conversion of the acid anhydride in the melt. In this process, the cellulose nitrate is dissolved in the acid anhydride melt and esterified at a temperature above the melting point of the acid anhydride. In this case, no further solvents are needed.

To produce the dispersions according to the invention, the cellulose nitrate derivative according to the invention may be directly dispersed in water as a solid. The cellulose nitrate derivative is preferably first dissolved in an organic, highly volatile solvent and then dispersed in water. A particularly suitable solvent is acetone. The organic solvent can be readily removed from the finished dispersion by heating, preferably under reduced pressure (e.g., by means of vacuum distillation).

To produce a permanently stable dispersion, it is important that at least some of the acid groups of the cellulose nitrate derivative are in the form of anions. Anion formation may be achieved by adding a base to the dispersion or pre-dispersion. It is possible for the base both to be added before dispersing and to be present in solution in the water used for dispersing.

Possible bases that may be used to produce the dispersions according to the invention include mineral bases, such as the hydroxides of the alkali metals, and organic bases, such as amines. Particularly preferred are amines represented by the following formula, $NR_1R_2R_3$ in which $R_1$, $R_2$ and $R_3$ each independently denote hydrogen, aminoalkyl, alkyl, aryl or alkenyl radicals, provided that at least one of $R_1$, $R_2$ and $R_3$ is other than hydrogen. Examples of such compounds are ammonia, ethylamine, propylamine, butylamine, diethylamine, dipropylamine, dipropylenetriamine, trimethylamine, triethylamine, ethylenediamine, diethylenetriamine, ethanolamine, dimethylaminoethanol, trimethanolamine, pyridine, aniline, urotropine, 3-aminopropene, diallylamine, morpholine and isophoronediamine.

Examples of suitable organic amines include, but are not limited to, ethylamine, propylamine, butylamine, diethylamine, dipropylamine, dipropylenetriamine, trimethylamine, triethylamine, ethylenediamine, diethylenetriamine, ethanolamine, dimethylaminoethanol, trimethanolamine, pyridine, aniline, urotropine, 3-aminopropene, diallylamine, morpholine and isophoronediamine.

Other additives that improve the properties of dispersions with regard to their particular application may be added to the dispersions of the present invention. Such additives include plasticising or film-forming substances, for example. Possible plasticisers include, for example, fatty acid esters, such as triacetin, diethylene glycol monobutyl ether, dipropylene glycol dimethyl ether, 2,2,4-trimethyl-1,3-pentanediol monoisobutyrate, butyl polyglycol, phthalates, such as diisobutyl phthalate, dibutyl phthalate and polyethylene glycol.

It is also possible to disperse the cellulose nitrate derivatives according to the invention with other aqueous systems to form stable dispersions. Suitable aqueous systems include, for example, alkyd, acrylate or polyurethane dispersions.

The cellulose nitrate derivative-containing dispersions of the present invention may be formulated in such a way that they can be used, for example, as leather or wood coating compositions. In such applications, cellulose nitrates are typically used in the form of solvent-containing coating compositions in light of the outstanding properties that they provide, such as improved gloss, grindability, hardness and grain enhancement. For example, a cellulose nitrate derivative-polyurethane dispersion (CND-PU) according to the present invention is capable of forming a clear and hard film at room temperature, both on glass and on wood substrates.

The dispersions according to the invention are lower in viscosity and possess higher solids contents than organic cellulose nitrate solutions.

EXAMPLES

The nitrogen content of the cellulose nitrates and cellulose nitrate derivatives was determined by the Schlösing-Schulze-Tiemann method. This involves heating the nitrate with iron(II) chloride and hydrochloric acid. As a result, the nitrate ion is reduced to NO. The NO that has been collected is measured and the weight (nitrogen proportion %) is calculated from the reduced volume.

The determination of the degree of substitution of acid groups in the cellulose nitrate derivatives (DS(acid)) took place by potentiometric titration. This involved dissolving part of the well purified cellulose nitrate derivative (CNDs) in methanol and titrating against an ethanolic sodium hydroxide solution (concentration 0.02 mol/l). The number of anionic groups per unit mass of CND could be determined from the point of change. The degrees of substitution were determined from the combination of these values and the respective nitrogen contents.

Examples 1–11

Production of Cellulose Nitrate Succinate 100 g of dried cellulose nitrate are dissolved in 400 g acetic acid. Succinic anhydride is then added and the solution stirred for 4 hours at 100° C. The reaction product is then precipitated in water and washed several times with an excess of water until neutral. Remaining succinic anhydride is hydrolysed during the washing and separated from the CND as a water-soluble compound. In Table 1, the quantities of succinic anhydride used and the results of the titration and nitrogen determination are listed.

TABLE 1

| Example | Nitrogen content cellulose nitrate | Mass of succinic anhydride | Nitrogen content cellulose nitrate succinate | DS (acid) |
| --- | --- | --- | --- | --- |
| 1 | 11.08% | 80 g | 10.29% | 0.04 |
| 2 | 11.08% | 120 g | 10.34% | 0.09 |
| 3 | 11.08% | 200 g | 10.25% | 0.13 |
| 4 | 11.40% | 80 g | 10.64% | 0.19 |
| 5 | 11.40% | 120 g | 10.55% | 0.22 |
| 6 | 11.40% | 200 g | 10.42% | 0.26 |
| 7 | 12.19% | 20 g | 12.01% | 0.05 |
| 8 | 12.19% | 40 g | 12.06% | 0.08 |
| 9 | 12.19% | 80 g | 11.86% | 0.11 |
| 10 | 12.19% | 120 g | 11.64% | 0.14 |
| 11 | 12.19% | 200 g | 11.64% | 0.16 |

Examples 12–13

Production of Cellulose Nitrate Maleate 150 g of maleic anhydride are heated to reaction temperature. 30 g of cellulose nitrate are stirred into the maleic anhydride melt. The solution is stirred for 120 minutes. The product is then precipitated in 6–10 times the volume of water and washed with water until neutral. In Table 2, the reaction temperatures and the results of the nitrogen determination and the titration are listed.

TABLE 2

| Example | Nitrogen content cellulose nitrate | Temperature | Nitrogen content cellulose nitrate maleate | DS (acid) |
| --- | --- | --- | --- | --- |
| 12 | 10.70% | 80° C. | 9.37% | 0.09 |
| 13 | 10.70% | 100° C. | 8.94% | 0.16 |

Examples 14–16

Production of Solvent-Free Cellulose Nitrate Derivative Dispersions 5 g of cellulose nitrate derivative (CND) are dissolved in 20 g acetone and neutralised with 0.2 g dimethylaminoethanol. The solution is then dispersed with 20 g water using an Ultra-Turrax. The acetone is subsequently removed from the dispersion in a rotary evaporator. The stability of the dispersions obtained is assessed visually for the formation of sediment. The results are compiled in Table 3.

TABLE 3

| Example | CND from Example | Property |
| --- | --- | --- |
| 14 | 1 | Permanently stable dispersion |
| 15 | 2 | Permanently stable dispersion |
| 16 | 3 | Permanently stable dispersion |
| 17 | 4 | Permanently stable dispersion |
| 18 | 5 | Permanently stable dispersion |
| 19 | 6 | Permanently stable dispersion |
| 20 | 7 | Sediment after 5 days: 28.6% |
| 21 | 8 | Sediment after 5 days: 15.0% |
| 22 | 9 | Permanently stable dispersion |
| 23 | 10 | Permanently stable dispersion |
| 24 | 11 | Permanently stable dispersion |
| 25 | 12 | Sediment after 12 hours |
| 26 | 13 | Sediment after 12 hours |

Example 27

Production and Properties of a Solvent-Free CND-PU Dispersion 40 g of a cellulose nitrate derivative from Example 1 are dissolved in 320 g acetone and 1.6 g of triethylamine are added. The solution is dispersed together with 100 g of a 40% PU dispersion Bayhydrol PR240 and with 140 g water using an Ultra-Turrax. The acetone is subsequently removed from the dispersion under reduced pressure in a rotary evaporator. A film of the dispersion is applied on to a glass plate using a 120 μm doctor knife. This clear, smooth film displays substantially higher pendulum hardness and grindability than that of the pure PU dispersion: Bayhydrol PR240 without added CND (König pendulum hardness (after 7 days): CND-PU film: 92, PU film: 35).

Comparative Examples

Dispersing Unsubstituted Cellulose Nitrates 5 g batches of cellulose nitrate (with 10.70% N, 11.40% N and 12.19% N) are each dissolved in 20 g acetone. 20 g of water are added to the solutions while dispersing with an Ultra-Turrax. When water is added to the solution, the cellulose nitrate precipitates as a viscous mass, which cannot be dispersed.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An anionic cellulose nitrate derivative prepared by a process comprising esterifying cellulose nitrate with at least one dicarboxylic acid anhydride,
wherein said anionic cellulose nitrate derivative has,
   (i) a degree of acid group substitution (DS (acid)) in the range of 0.01 to 0.2, and
   (ii) a nitrogen content of 10.7 wt. % to 12.3 wt. %, based on the weight of cellulose nitrate derivative.

2. The anionic cellulose nitrate derivative of claim 1 wherein said dicarboxylic acid anhydride is succinic anhydride.

3. The anionic cellulose nitrate derivative of claim 1 wherein said dicarboxylic acid anhydride is maleic anhydride.

4. The anionic cellulose nitrate derivative of claim 1 wherein said anionic cellulose nitrate derivative has a nitrogen content of 12.0 wt. % to 12.3 wt. %, based on the weight of cellulose nitrate derivative.

5. A process of preparing an anionic cellulose nitrate derivative comprising esterifying cellulose nitrate with at least one dicarboxylic acid anhydride,
wherein said anionic cellulose nitrate derivative has,
   (i) a degree of acid group substitution (DS (acid)) in the range of 0.01 to 0.2, and
   (ii) a nitrogen content of 10.7 wt. % to 12.3 wt. %, based on the weight of cellulose nitrate derivative.

6. The process of claim 5 wherein the esterification reaction is performed in a melt of said dicarboxylic acid anhydride.

7. An aqueous dispersion comprising:
   (a) at least one anionic cellulose nitrate derivative; and
   (b) at least one base,
wherein said anionic cellulose nitrate derivative is prepared by a process comprising esterifying cellulose nitrate with at least one dicarboxylic acid anhydride, and further wherein said anionic cellulose nitrate derivative has,
   (i) a degree of acid group substitution (DS (acid)) in the range of 0.01 to 0.2, and
   (ii) a nitrogen content of 10.7 wt. % to 12.3 wt. %, based on the weight of cellulose nitrate derivative.

8. The aqueous dispersion of claim 7 wherein the base is selected from the group consisting of (i) alkali metal compounds, (ii) ammonia, (iii) organic amines represented by the following general formula, $NR_1R_2R_3$ wherein $R_1$, $R_2$ and $R_3$ are each independently selected from the group consisting of hydrogen, aminoalkyl, alkyl, aryl and alkenyl radicals, provided that at least one of $R_1$, $R_2$ and $R_3$ is other than hydrogen, and (iv) combinations of at least two of (i), (ii) and (iii).

9. A process of preparing the aqueous dispersion of claim 7 comprising dispersing said anionic cellulose nitrate derivative in a medium selected from the group consisting of water and an aqueous system.

10. The process of claim 9 wherein said aqueous system is selected from the group consisting of alkyd dispersions, acrylate dispersions, polyurethane dispersions and combinations thereof.

* * * * *